ABSTRACT OF THE DISCLOSURE

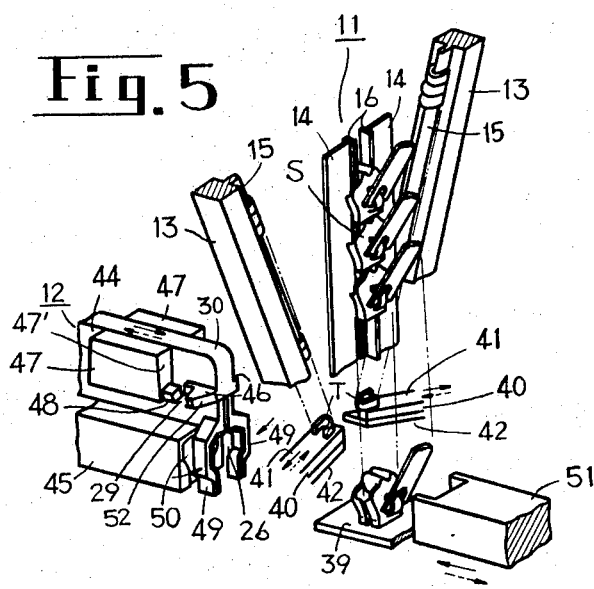
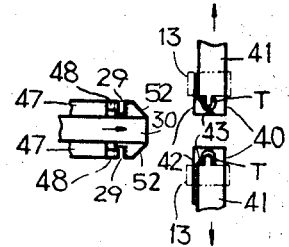
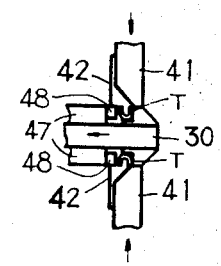
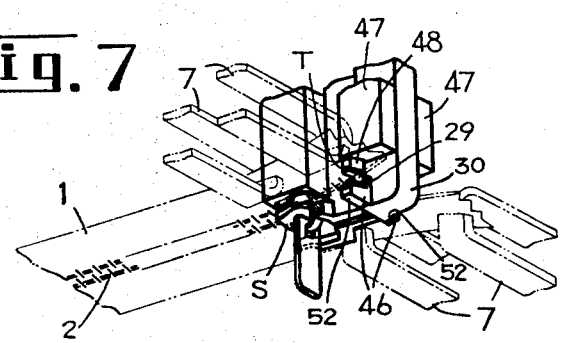

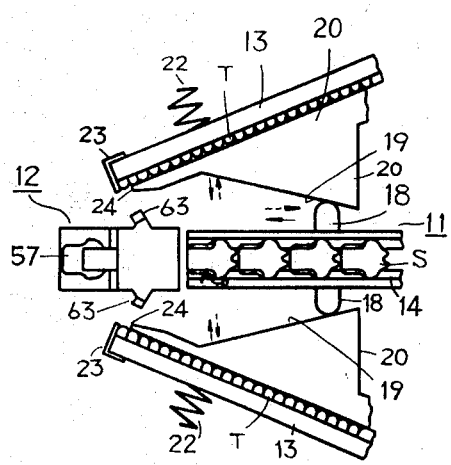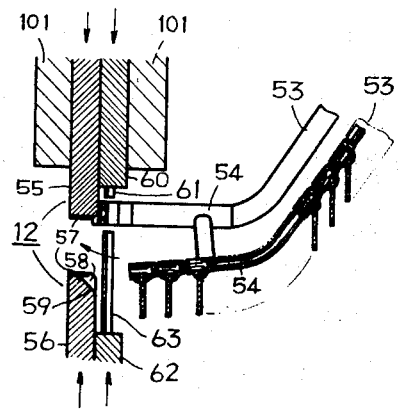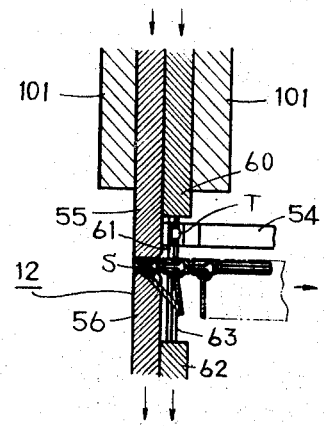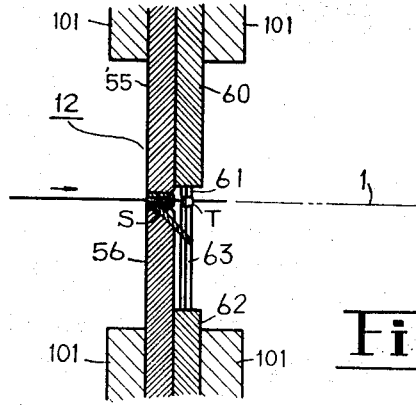

A method and apparatus for assembling slide fasteners having sliders and top stops in an automatic cycle of operation. Apparatus comprises means for cutting a fastener chain carrying interlocking elements to individual unit lengths, means for attaching thereto sliders and top stops, and drawing the assembled slide fasteners out of the machine while maintaining the chain in a successive movement.

---

This invention relates to an apparatus for assembling slide fasteners, and more particularly to an apparatus for applying a slider and top stops simultaneously to a fastener chain of the type consisting of a pair of continuous length stringer tapes having alternate element-containing and element-free sections.

The recent trend of this industry has been directed toward automation of the assembly of slide fasteners to achieve increased efficiency and reduced manual labor. A great many attempts have been made to develop means to accomplish this end, but have met with considerable difficulties. For one thing, the fastener chain must be maintained in a successive, unidirectional movement throughout the mechanical cycle of operation for placing a slider on the stringer tape, positioning and securing end stops thereon, and cutting the chain to individual slide fastener lengths. While it is desirable for accurate positioning of the slider and top stops that the tape be first cut and spread before these parts are mounted, this has been difficult to achieve without discontinuing the flow of the chain. One prior-art method teaches securing the parts to the fastener chain without having to discontinue its movement, but has the drawback that the chain is forced spread at its intermittent element-free or space portions for positioning the sliders and top stops. Not only does this method require complicated mechanisms, but also it cannot ensure the accuracy required to position the top stops with respect to the inner edges of the tape. Furthermore, since this prior-art method requires that the chain be cut to unit lengths after the assembly of the parts to the tape still spread apart, it is difficult to provide straight cuts at right angles to the axis of the chain. For these and other reasons, there has been heretofore developed no practical apparatus which proves conducive to true automation of the assembly of slide fasteners.

Whereas, it is the principal object of the instant invention to provide a new and useful apparatus which will accomplish the assembly of slide fasteners in an automatic cycle of operation and which will eliminate the above-noted difficulties.

It is another object of the invention to provide a new and useful machine of this character which will ensure smooth and acurate positioning of sliders and top stops on the fastener chain.

It is a further, more specific object of the invention to provide a new and useful combination of means for maintaining the fastener chain in a successive, undirectional motion; means for transferring and securing a slider and top stops to the tape; means for cutting the chain; and means for drawing the assembled tape out of the machine.

These and other objects and features of the invention will become more apparent from the following detailed description taken in connection with the accompanying drawings in which:

FIG. 5 is a perspective view, partially exploded, illustrating another form of the parts holder and its associated parts feeder of another form embodying the invention;

FIGS. 6a and 6b are schematic plan views illustrating the manner in which the parts holder receives two top stops from the parts feeder;

FIG. 7 is a perspective bottom view illustrating the parts holder of FIG. 5 as positioned in alignment with a horizontally moving faster chain for the transfer to this latter of the slider and top stops;

FIG. 8 is a plan view of still another form of the parts feeder embodying the invention, said feeder being movable with respect to its associated parts holder which is vertically movable;

Figure 10:
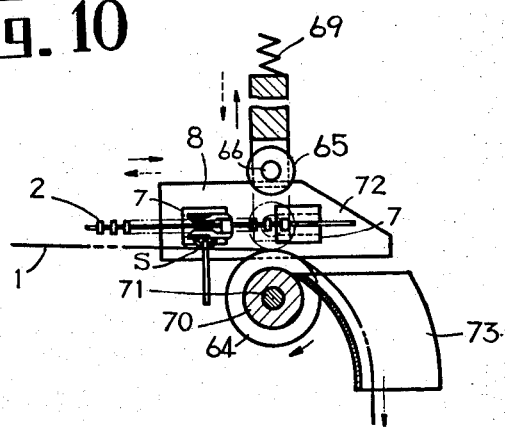
Figure 11:
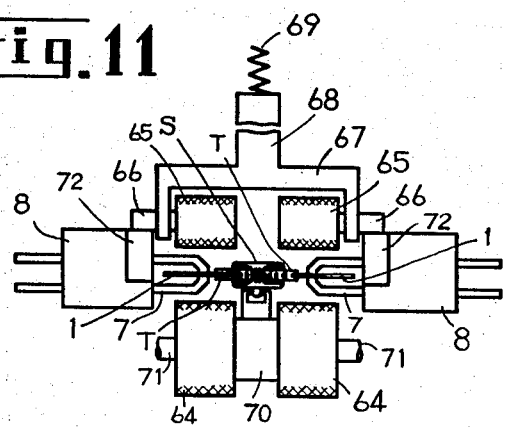

FIGS. 9a through 9c, inclusive, are side views illustrating how the parts feeder and holder of FIG. 8 cooperate in securing the parts to the fastener chain;

FIG. 10 is a side view illustrating a roller conveyor arrangement, which forms another important aspect of the invention, for continuously driving the assembled slide fasteners out of the machine; and FIG. 11 is a front view of the roller conveyor of FIG. 10.

Like numerals refer to like and corresponding parts throughout the drawings, and the arrow marks indicate the direction of movement of the moving components of the machine.

Briefly stated, the inventive concept of this invention resides in a series of steps of operation which comprises advancing the tape in a horizontal path of travel to a first point at which a mechanical cycle commences; transferring a slider and top stops at a time from their respective supply tracks to a parts holder; positioning said parts holder in alignment with the path of tape travel; gripping the tape and moving the same from said first point to a second point toward said parts holder; threading the tape first through the slider, spreading apart the opposing halves of the tape and then positioning the top stops thereon; clamping the top stops to the tape; holding the leading end of the thus assembled tape at said second point and drawing the same by a distance determined by the arrival of the ensuing element-containing section of the tape at said first point; and cutting the preceding tape afterward of said first point in response to the arrival thereat of said ensuing element-containing section of the tape, thus repeating the mechanical cycle.

The various phases of the afore-mentioned mechanical cycle are shared by the important components of the machine generally shown in FIG. 1 which are interrelated and synchronized in operation as hereinafter described. However, it is not the intention of the present inventor to disclose any details of the power system which drives the operating components of the machine, or the electrical/mechanical units which control the timing of the operating components in the mechanical cycle. They are conventional and hence not illustrated.

The fastener chain or tape 1 carrying rows of interlocking fastener elements 2, which may be endless, or of any desired predetermined length, is oriented in the direction of its movement by a suitable guide roller 3 so that the tape moves in a substantially horizontal path through the machine. The tape 1 is moved by an advancing means to a first point in the path at which the leading element thereof contacts a feeler pin 4 whereupon the mechanical cycle commences in accordance with the invention. This tape movement is also effected by a part of the advancing means comprising a reciprocating gripper 5 hereinafter referred to as a second gripper. This feeler pin 4 is arranged to rise in the gap or element-free portion of the tape and sink underneath the tape when it contacts the leading element thereof. This arrangement is known, hence not illustrated.

There are shown the coacting vertical cutters 6 which are connected to a suitable drive (not shown) for operation in response to the activation of the feeler 4.

The advancing means for advancing the zipper tape comprises two opposing grippers 7 each comprising a pair of clips accommodated in a gripper holder box 8, these grippers being referred to hereafter as first grippers in contrast to the aforesaid second gripper 5 and it should be noted that the coordinated operation of the first and second gripper mechanisms comprise the advancing means. The gripper box 8 is provided with a downwardly extending slide pin 9 for slidable engagement with a longitudinal guide slot 10 along which the first gripper 7 is transported, said slot 10 being formed in a longitudinal plate member 10a secured to the machine table (not shown) and having a dogleg part 10'.

The tape 1 receives a slider and top stops from the parts feeding mechanism, hereinafter discussed, which forms an important aspect of the instant invention.

Figure 1:
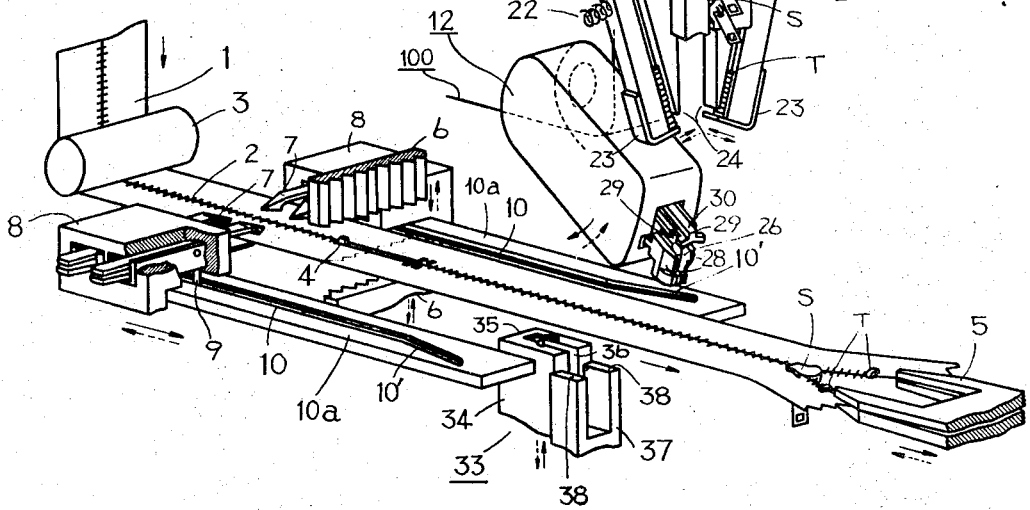
FIG. 1 is a perspective view of the machine according to the invention utilized to explain the operations of its important component mechanisms.
Figure 2:
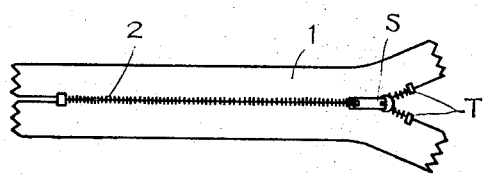
FIG. 2 is a plan view of an example of the slide fastener assembled and cut to a desired unit length according to the invention.

One preferred form of the parts feeding mechanism is illustrated in FIG. 1 and more clearly in FIGS. 3a–3d, in which generally designated at 11 is a parts feeder cooperating with a parts holder or holding means generally designated at 12. The parts feeder 11, shown in FIG. 3a, essentially comprises a pair of opposed substantially vertical side chutes 13 and a center vertical chute 14 extending therebetween. Each side chute 13 has a track 15 communicating with a vibrating hopper (not shown) of the conventional type for gravity delivery of the top stops therealong. The center chute 14 has a track 16 for a delivery of sliders comprising spaced parallel rails similarly communicating with the hopper. While the slider chute 14 is built stationary, the top stop chutes 13 are movable towards and away from each other at the lower ends substantially in a V fashion. This movement is provided by a vertically movable lever 17 with protuberances 18 as it slides along the cam face 19 of a cam plate 20 having its outer side 21 in abutting relation to the top stop rail 15 to prevent the derailing of top stops T. Descending of the lever 17 brings the side chutes 13 close together through the action of a spring 22 attached to the outer side of each of these chutes.

Conversely, ascending of the lever 17 urges the side chutes 13 to move away from each other against tension in the spring 22. The lower pointed end of each cam plate 20 terminates just short of an elbow 23 serving as a stopper for resting the leading top stop thereon and attached to the bottom of the side chute 13, leaving thereat a space or opening 24 just large enough to allow one top stop T to slip into the parts holder 12 whose construction is hereafter described. The vertically reciprocable lever 17 has a finger 25 adapted to engage and transfer the leading slider S to the parts holder 12 during each downstroke of the lever. As better shown in FIG. 3c, the transfer of the slider is simultaneous with that of the top stops because the cam face 19 is calculated, as aforementioned, to permit the side chutes 13 to meet together over the parts holder 12 when the lever 17 has descended to the position for placing the slider onto the parts holder 12.

Figure 3A:
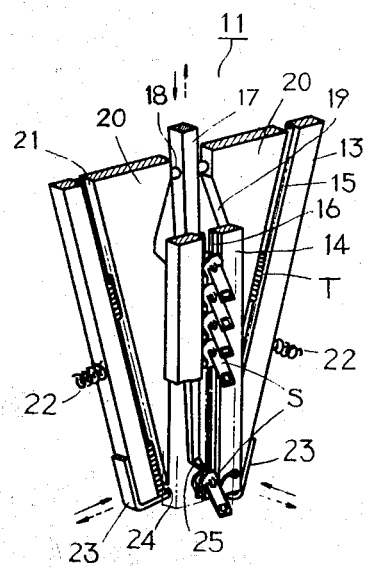
FIGS. 3a and 3b are perspective views illustrating a parts feeder and a parts holder, respectively, which form one important aspect of the invention.
Figure 3B:
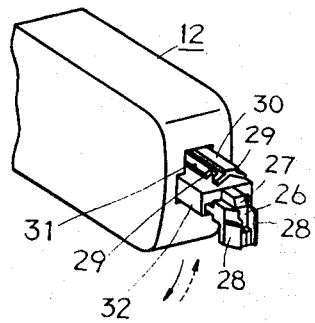

The parts holder 12 or holding means is illustrated in FIG. 3b as comprising a slider nest 26 formed with a block member 27 and spring-actuated side walls 28 whereby the nest 26 resiliently engages and releasably retains the slider S, and two opposed top stop nests 29 formed with a spring-actuated yoke member 30 associated with bars 31 for resiliently engaging and releasably retaining two top stops T at a time. The slider nest 26 is spaced apart from the top stop nests 29 by a block 32 so that the former precedes the latter in position relative to the tape 1 when the parts holder 12 swings arcuately into the path of the tape as seen from FIG. 4, or more clearly from FIG. 7.

Figure 4:
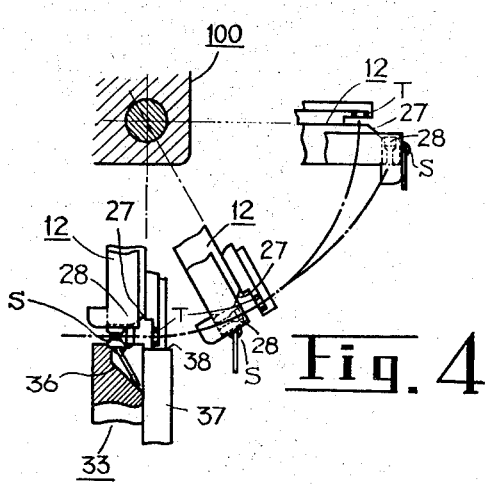
FIG. 4 is a side view, partially sectional, illustrating the parts holder as moving along an arcuate locus defined between the parts feeder and a vertical movable block member.

As schematically illustrated in FIGS. 1 and 4, the parts holder 12 of FIG. 3b is pivotally connected by any suitable means to the machine frame generally designated at 100, so that it may swing along an arcuate locus defined between the parts feeder 11 and a vertically movable support means or member 33. The holding means 12 and the support means 33 constituted a single means for automatically threading a slider on the interlocked fastener elements as the zipper tape 1 is advanced. The support means 33 essentially comprises a large block 34 having a slider receiving surface 35 and a recess 36 adapted to let the pull tab of the slider depend therein, and a small block 37 of substantially U-shape with punch heads 38 to abut against the yoke. While the slider support block 34 simply reciprocates vertically into and out of engagement with the slider nest 26, the top stop support block 37 makes a two-step upward stroke independently from the block 34. In the first upward stroke, the block 37 abuts against the yoke 30 as the parts holder 12 engages the support 33 in the path of the tape. Subsequently, in the second upward stroke, which is relatively short, the punch heads 38 of the block 37 ram the yoke 30 against the bars 31 thereby clamping the top stops to the tape.

Reference now to FIGS. 5, 6a–6b and 7 shows a modification of the parts feeder and holder assembly according to the invention. This modification is essentially analogous in construction to the embodiment discussed in connection with FIGS. 3a–3d, with the exceptions which will be described below.

Figure 3C:
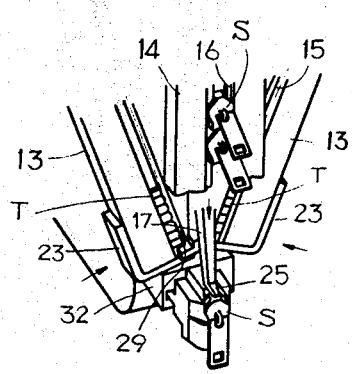
FIG. 3c is a perspective view illustrating the parts feeder as engaged with the parts holder for transferring thereto one slider and two top stops.
Figure 3D:
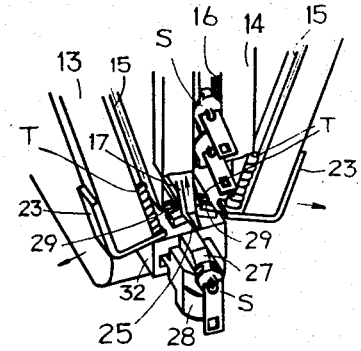
FIG. 3d is a perspective view illustrating the parts feeder as disengaged from the parts holder.

The parts feeder 11 shown in a partly exploded view of FIG. 5 is provided with a slider stopper 39 adapted to place thereon one slider at a time in the manner shown, and with separable top stop stoppers 40 corresponding in function to the elbows 23 attached to the side chutes 13 shown in FIGS. 3a, 3c and 3d. Each top stop stopper 40 comprises an upper movable plate 41 and a lower stationary plate 42. The upper plate 41 is provided with a cut-in part 43 designed to facilitate the transfer of the leading top stop to the parts holder 12.

The parts holder 12 cooperating with the parts feeder 11 just described is similar to its first embodiment shown in FIG. 3b in that it is also movable arcuately in the manner illustrated in FIG. 4. In addition to the arcuate movement, this parts holder modification 12 of FIG. 5 is arranged to move horizontally toward and away from the parts feeder in order to receive the parts therefrom. It comprises an upper block member 44 and a lower block member 45. The upper block 44 has integral therewith a movable yoke 30 having a wing part 46 on each side and has mounted thereon a support block 47 which is stationary with respect to the movable yoke 30. The block 47 is provided with a shoulder part 47' for abutment to the side chutes 13 of the parts feeder 11 to limit the horizontal movement of the parts holder 12 with respect to the parts feeder 11. The block 47 is further provided with a lug 48 for engagement with the wing part 46 of the yoke 30. The lug 48 and the wing part 46 define a top stop nest 29 as shown. The lower block member 45 carries spring-actuated jaws 49 which correspond to the aforesaid spring-actuated side walls 28 and which are normally urged inwardly for resiliently engaging and releasably retaining the slider S. The jaws 49 are also arranged to move, independent from the lower block 45, horizontally toward and away from the slider chute 14. The lower block 45 is further provided with a recess 50 configured to conform with the contour of the slider, thus defining a slider nest 26.

Designated at 51 is a reciprocable block member for pushing the slider off the stopper 39 and into the slider receiving recess 50 by forcing apart the jaws 49. This slider transfer may take place simultaneously as the upper block 44, or yoke 30 moves horizontally towards the top stop chutes 13, or more specifically towards the stoppers 40 to receive top stops therefrom in the manner illustrated in FIGS. 6a and 6b. The reciprocable yoke 30 has cam ends 52 to abut snugly against the cut-in portions 43 of the upper movable plate 41, and the wing portion 46 substantially equals in thickness to the movable plate 41, so that as the yoke 30 of the parts holder 12 advances in between the opposed stoppers 40, the wing portion 46 rides over the lower plates 42 of the stopper 40 and lies flush with the upper movable plates 41. The yoke 30 further advances in this manner and pushes the upper plates 41 apart until the top stops T fall into the respective nests 29 defined by the inner wall of the wing 46 and the lug 48 of the block 47. This is followed by the retraction of the yoke 30, which is as short as is required to hold the top stops resiliently between the wings 46 and the lugs 48, before the yoke 30 finally releases the stoppers 40 and returns to its normal position. Each support block 47 is provided with shoulder portion 47' for abutting against each top stop chute 13, which is held stationary in this modification, and thus for limiting the forward movement of the parts holder with respect to the parts feeder 11.

FIG. 7 illustrates the parts holder 12 of FIG. 5 as in engagement with the tape 1 for securing thereto the slider and top stops. It will be appreciated that the horizontal motion of the yoke 30 and that of the slider jaws 49, respectively, serve the purpose of leaving the top stops and slider with the tape. It will also be appreciated that the backward movement of the yoke 30 may be slightly increased so as to ram the wings 46 against the lugs 48 thereby clamping the top stops to the tape, thus obviating the necessity of installing the reciprocating punch head 38 discussed in connection with the first embodiment shown in FIG. 1.

FIGS. 8 and 9a–9c, inclusive, illustrate another modification of the parts feeder and holder assembly embodying the invention. This assembly is characterized by the movement of the parts feeder 11 with respect to the parts holder 12 different from the preceding embodiments. Each of the top stop and slider chutes consists of a sloping section 53 and a relatively short horizontal section 54. The sliders and top stops are delivered by gravity down their respective sloping sections 53 of the track and onto the horizontal sections 54 where the leading slider and top stops are positioned for placement on the parts holder 12. In this arrangement, the transfer of the slider is simultaneous with that of the top stops as in the case of the first embodiment discussed in connection with FIG. 3a. The only difference is that the protuberances 18 abutting against the cam face 19 are provided on the slider chute 14, which is movable in the direction of the arrow, instead of using the lever 17. The parts holder in this example comprises two sets of block members opposed to each other across the path of the fastener chain and vertically movable along the guide blocks 101. The first set forms a slider holder consisting of an upper block member 55 and a lower block member 56, both having symmetrical recesses 57 for accommodating a slider therein. The lower recess 57 is further provided with a pocket 58 having an inclined wall surface 59 against which the pull tab of the slider is disposed to lean. The second set forms a top stop holder consisting of an upper block member 60 having a short projection 61 and a lower block member 62 having a long projection 63, both projections holding therebetween a top stop delivered from the chute 13 in the manner already discussed in regard to the parts feeder 11 shown in FIG. 3a. Depending upon a design choice, either of the projections 61 and 63 may be arranged to make an extra short stroke to clamp the top stop securely to the tape.

Reference lastly to FIGS. 10 and 11 shows a roller conveyor assembly for drawing the assembled tape out of the machine which essentially comprises a pair of drive rollers 64 and a pair of vertically displaceable pressure rollers 65, both pairs being disposed in vertically opposed relation. The rollers in each pair are horizontally spaced apart to leave a sufficient clearance for the path of the slider. Referring specifically to FIG. 11, it will be seen that the upper rollers 65 are freely mounted on their respective shafts 66 which are secured to a bridge member 67 having a center portion 68 extending upright and connected with a spring 69, while the lower rollers 64 are joined by coupling 70 to a drive shaft 71 and are in constant rotation therewith. This tape removal assembly is considered as a substitution for the second reciprocating gripper 5 discussed on FIG. 1, but is preferred thereto where the desired individual fastener lengths are greater, which would otherwise require increased stroke of the reciprocating gripper 5 and hence, more floor space for equipment installation.

The first gripper holders 8 with which the roller arrangement of FIGS. 10 and 11 cooperate in removing the assembled tape off the machine are provided each with a cam portion 72 at the advancing end thereof, along which the upper roller 65 ascends and descends through the action of the spring 69 according as the gripper 7 advance and retreat. The roller shafts 66 ride over the cam surfaces 72 of the gripper holder 8 as this latter advances in between the rollers 65 and the rollers 64. The gripper holder 8 stops at a predetermined point in the path of the tape at which the upper rollers 65 are situated on the horizontal section of the holder 8, as seen in FIGS. 10 and 11, whereupon the grippers 7 release the assembled tape and the holder 8 begins to retract. This retraction of the holder 8 causes the upper rollers 65 to descend along the cam surfaces 72 until they come into contact with the tape and press this against the lower rollers 64, whereupon the tape is frictionally transported down the periphery of the rollers 64 and into a tape chute 73.

Having thus described the construction and arrangements of the important mechanical components according to the invention, the operation thereof will now be discussed in connection with the preferred embodiment of the assembling machine generally depicted in FIG. 1.

The fastener chain or zipper tape 1 advances to a first point in its path at which the leading one of the elements 2 on the tape contacts the feeler pin 4, whereupon the mechanical cycle of operation commences in accordance with the invention. The first phase of the cycle thus begins with activation of the feeler 4 in contact with the leading element on the tape 1, whereupon the feeler 4, connected to a solenoid (not shown) supplies power to the mechanical clutch which drives the coacting vertical cutters 6. In the second phase of the mechanical cycle, the coacting cutters 6 operate in response to the solenoid connected to the feeler 4, sever the tape 1 and move back apart out of the path of the tape. This is followed by the third phase of the cycle wherein the parts holder 12 carrying a slider and top stops swings into the path of the tape and stands by at a second point in the path of the tape at which the tape is assembled. Simultaneous with this stand-by positioning of the parts holder 12, the fourth phase of the cycle advances the second gripper 5 toward the parts holder 12 to stand by for the tape adjacent to said second point. The third and fourth phases of the cycle should be complete before the tape 1 arrives at the second point where the assembly takes place.

In the fifth phase of the cycle, which is practically simultaneous with the action of the cutters 6, the first grippers 7 move forward along the guide slot 10, grip the tape 1 close to its inner edges and adjacent to its leading end, which has just been cut, and advance to the second point or operating zone, whereupon a sixth phase of the cycle follows. In this phase, the tape is threaded through the parts holder 12 on stand-by to receive the slider therefrom and then, is spread apart to shift the slider backwardly along the rows of fastener elements as the first grippers 7 move slightly outwardly along the dog-leg portion 10' of the slot 10, followed by positioning the top stops on the inner edges of the tape.

In the seventh phase of the cycle, the punch heads 38 of the reciprocating block 37 clamp the top stops securely to the tape. Immediately before the completion of this clamping operation, the eighth phase of the cycle occurs in which the second gripper 5 on stand-by grips the leading end of the assembled tape simultaneously as the first grippers 7 release the same.

The ninth phase of the cycle simultaneous with the completion of the above clamping operation sends the parts holder 12 now empty back to the original horizontal position along the arcuate locus illustrated in FIG. 4, for receiving another set of one slider and two top stops from the parts feeder 11. The transfer of these parts from the feeder 11 to the holder 12 constitutes the tenth phase of the cycle.

In the eleventh phase of the cycle, the first grippers 7 return past the cutters 6 and the feeler 4 to the original position shown in FIG. 1, while the second gripper 5 retracts in the opposite direction drawing the assembled tape out of the machine until the leading element of the ensuing tape unit of the chain contacts the feeler 4. At this time point, the mechanical cycle is repeated.

The described operation and the apparatus to carry this operation into practice are simple and reliable. Yet, as compared to hand assembly of sliders and top stops to the chain, including isolated chain cutting operations as in conventional practice, the rate of assembly is increased manifold.

While specific embodiments of the invention have been shown and described to illustrate the application of the invention, it will be understood that various changes may be made therein without departing from the scope of the appended claims.

As for an example, one of the two side chutes of the parts feeder for top stops delivery may be placed out of operation, so that a single top stop is attached to the tape as is often desired depending upon the type of the slide fastener used.

What is claimed is:

1. In the manufacture of slide fasteners from a fastener chain consisting of a pair of continuous length tapes having alternate element-containing and element-free sections, the machine for assembling said fastener chain with sliders and top stops which comprises in combination: means for stopping the travel of the tape when in contact with the leading element thereof at a first point at which the mechanical cycle commences; coacting cutters vertically disposed adjacent to said first point for severing the element-free section of the tape in response to said stopping means; a first gripper consisting of a pair of opposed clips for gripping and advancing the tape in a horizontal path of travel; a parts holder provided with nests each for resiliently engaging and releasably retaining a slider and top stops and adapted to swing arcuately toward and away from a second point in the path of the tape at which said first gripper passes the tape through the parts holder to receive the slider and top stops therefrom; dog-legged slots along which said first gripper travels to spread apart the opposing halves of the tape; means for clamping the top stops to the tape; a parts feeder for delivering a slider and top stops at a time to their respective nests in said parts holder; and a second gripper adapted to reciprocate toward and away from said second point for gripping and drawing the assembled tape out of the machine.

2. In the manufacture of slide fasteners from a fastener chain consisting of a pair of continuous length tapes having alternate element-containing and element-free sections, the machine for assembling said fastener chain with sliders and top stops which comprises in combination: means for stopping the travel of the tape when in contact with the leading element thereof at a first point at which the mechanical cycle commences; coacting cutters vertically disposed adjacent to said first point for severing the element-free section of the tape in response to said stopping means; a first gripper consisting of a pair of opposed clips for gripping and advancing the tape in a horizontal path of travel; a parts holder provided with nests each for resiliently engaging and releasably retaining a slider and top stops and adapted to move vertically toward and away from a second point in the path of the tape at which said first gripper passes the tape through the parts holder to receive the slider and top stops therefrom; dog-legged slots along which said first gripper travels to spread apart the opposing halves of the tape; means for clamping the top stops to the tape; a parts feeder for delivering a slider and top stops at a time to their respective nests in said parts holder, said parts feeder being movable toward and away from said parts holder; and a second gripper adapted to reciprocate toward and away from said second point for gripping and drawing the assembled tape out of the machine.

3. In the manufacture of slide fasteners from a fastener chain consisting of a pair of continuous length tapes having alternate element-containing and element-free sections, the machine for assembling said fastener chain with sliders and top stops which comprises in combination: means for stopping the travel of the tape when in contact with the leading element thereof at a first point at which the mechanical cycle commences; coacting cutters vertically disposed adjacent to said first point for severing the element-free section of the tape in response to said stopping means; a gripper consisting of a pair of opposed clips for gripping and advancing the tape in a horizontal path of travel; a parts holder provided with nests each for resiliently engaging and releasably retaining a slider and top stops and adapted to swing arcuately toward and away from a second point in the path of the tape at which said gripper passes the tape through the parts holder to receive the slider and top stops therefrom; dog-legged slots along which said gripper travels to spread apart the opposing halves of the tape; means for clamping the top stops to the tape; a parts feeder for delivering a slider and top stops at a time to their respective nests in said parts holder; and means comprising a drive roller and a vertically displaceable pressure roller engageable therewith for frictionally driving the assembled tape out of the machine.

4. In the manufacture of slide fasteners from a fastener chain consisting of a pair of continuous length tapes having alternate element-containing and element-free sections, the machine for assembling said fastener chain with sliders and top stops which comprises in combination: means for stopping the travel of the tape when in contact with the leading element thereof at a first point at which the mechanical cycle commences; coacting cutters vertically disposed adjacent to said first point for severing the element-free section of the tape in response to said stopping means; a gripper consisting of a pair of opposed clips for gripping and advancing the tape in a horizontal path of travel; a parts holder provided with nests each for resiliently engaging and releasably retaining a slider and top stops and adapted to move vertically toward and away from a second point in the path of the tape at which said gripper passes the tape through the parts holder to receive the slider and top stops therefrom; dog-legged slots along which said gripper travels to spread apart the opposing halves of the tape; means for clamping the top stops to the tape; a parts feeder for delivering a slider and top stops at a time to their respective nests in said parts holder, said parts feeder being movable toward and away from said parts holder; and means comprising a drive roller and a vertically displaceable pressure roller engageable therewith for frictionally driving the assembled tape out of the machine.

5. An apparatus for assembling sliders and top stops on a zipper tape comprising: advancing means for advancing a predetermined length of zipper tape having a plurality of interlocked fastener elements thereon to an operating zone; and means including said advancing means and single means for automatically threading a slider on the interlocked fastener elements and sequentially applying at least one top stop to the zipper tape.

6. An apparatus according to claim 5; wherein said single means includes holding means movable into and out of said operating zone for releasably holding both the slider and at least one top stop in a stand-by position ready for assembly on the zipper tape; and support means operable when said holding means is in the stand-by position for supporting the slider during and immediately subsequent to its threading onto the interlocked fastener elements.

7. An apparatus according to claim 6; wherein said support means includes punching means for clamping the top stop into position on the zipper tape after the threading of the slider on the interlocked fastener elements.

8. An apparatus according to claim 6; wherein said holding means and said support means are positioned on opposite sides of said zipper tape.

9. An apparatus according to claim 6; wherein said advancing means comprises a first gripper mechanism having a pair of opposed clips for gripping the zipper tape; and a second gripper mechanism for withdrawing the zipper tape from said operating zone.

10. An apparatus according to claim 6; wherein said advancing means comprises a gripper mechanism having a pair of opposed clips for gripping the zipper tape; and conveying means for withdrawing the zipper tape from said operating zone; said conveying means comprising a rotatably mounted friction drive roller on one side of the zipper tape and a rotatably mounted pressure roller on the other side of the zipper tape and displaceable relative to said drive roller.

References Cited

UNITED STATES PATENTS

| | | |
|---|---|---|
| 2,732,000 | 1/1956 | Levine. |
| 2,766,452 | 10/1956 | Hansen. |
| 2,972,150 | 2/1961 | Wegrzyn _____ 29—33.2 |
| 2,996,797 | 8/1961 | Carlile _____ 29—408 |
| 3,353,256 | 11/1967 | Frohlich et al. _____ 29—408 |

THOMAS H. EAGER, Primary Examiner

U.S. Cl. X.R.

29—33.2, 211